UNITED STATES PATENT OFFICE.

EMMERICH MARKOVITS, OF BERLIN, AND FRIEDRICH GUTHMANN, OF FRIEDENAU, GERMANY.

PROCESS OF MAKING A PREPARATION FOR PRESERVING MEAT.

SPECIFICATION forming part of Letters Patent No. 711,990, dated October 28, 1902.

Application filed March 7, 1902. Serial No. 97,210. (No specimens.)

*To all whom it may concern:*

Be it known that we, EMMERICH MARKOVITS, residing at Barwaldstrasse 15, Berlin, and FRIEDRICH GUTHMANN, residing at Niedstrasse 32, Friedenau, near Berlin, Germany, subjects of the King of Prussia, Emperor of Germany, have invented a certain new and Improved Process for the Manufacture of a Preparation for Preserving Meat and the Like, of which the following is a specification.

The present invention relates to a process for the manufacture of a preparation for preserving meat, fish, game, and the like; and its object is to provide the meat with a thin coating by painting it with the preparation, by which coating it will be protected for considerable time against putrefaction.

The essentially novel feature of the invention lies in the fact that the preparation itself, which is entirely innocuous to health, prevents the reception and development of putrefying germs, so that it is also absolutely impossible for germs of putrefaction which may have been on the surface of the meat to spread. The meat to be preserved retains its color, and the formation of maggots on the meat or the protective coating by the presence of flies is absolutely prevented.

The process for the manufacture of the preserving preparation is as follows: About forty per cent. of gelatin and fifteen per cent. agar-agar are dissolved in thirty-five per cent. distilled water with two per cent. of salt and boiled for some time. A jelly-like mass is thus obtained, to which, after cooling, about seven per cent. of pure alcohol and one per cent. of sodium salicylate are added. This mass after thorough mixing is again boiled with about ten per cent. of water, so that a fairly liquid preparation is obtained which congeals on cooling. For use it is liquefied by heat and painted evenly on the meat or the like to be preserved. The coating congeals in a few seconds and forms an entirely smooth and pliant covering.

We declare that what we claim is—

1. Process for the manufacture of a preparation for preserving meat and the like in which gelatin and agar-agar are dissolved in distilled water and salt and boiled, the mass produced being mixed after cooling with pure alcohol and sodium salicylate and again boiled with distilled water substantially as described.

2. Process for the manufacture of a preparation for preserving meat and the like in which about forty per cent. gelatin and fifteen per cent. agar-agar are dissolved in thirty-five per cent. distilled water and two per cent. salt, and boiled for a considerable time, the jelly-like mass produced being mixed after cooling with about seven per cent. of pure alcohol and one per cent. of sodium salicylate and again boiled with about ten per cent. of distilled water, substantially as described.

In witness whereof we have signed this specification in the presence of two witnesses.

EMMERICH MARKOVITS.
FRIEDRICH GUTHMANN.

Witnesses:
   WOLDEMAR HAUPT,
   HENRY HASPER.